United States Patent [19]

Wahl et al.

[11] Patent Number: 5,070,836
[45] Date of Patent: Dec. 10, 1991

[54] METHOD AND ARRANGEMENT FOR CONTROLLING THE INJECTION OF FUEL IN AN INTERNAL COMBUSTION ENGINE

[75] Inventors: Josef Wahl, Stuttgart; Alf Löffler, Markgröningen-Talhausen; Hermann Grieshaber, Aichtal-Aich; Wilhelm Polach, Möglingen; Ewald Eblen; Joachim Tauscher, both of Stuttgart; Helmut Laufer, Gerlingen; Ulrich Flaig, Markgröningen; Johannes Locher, Stuttgart; Manfred Birk, Oberriexingen; Gerhard Engel, Stuttgart; Alfred Schmitt, Ditzingen; Pierre Lauvin, Francheville; Fridolin Piwonka, Markgröningen; Anton Karle, VS-Villingen; Hermann Kull, Stuttgart, all of Fed. Rep. of Germany

[73] Assignee: Robert Bosch GmbH, Stuttgart, Fed. Rep. of Germany

[21] Appl. No.: 577,754

[22] Filed: Sep. 5, 1990

[30] Foreign Application Priority Data

Sep. 7, 1989 [DE] Fed. Rep. of Germany ....... 3929747

[51] Int. Cl.⁵ .................. F02D 41/40; F02M 45/02
[52] U.S. Cl. ................................. 123/299; 123/506
[58] Field of Search ................ 123/299, 300, 506

[56] References Cited

U.S. PATENT DOCUMENTS

| | | | |
|---|---|---|---|
| 4,704,999 | 11/1987 | Hashikawa et al. | 123/299 |
| 4,745,898 | 5/1988 | Egler et al. | 123/300 |
| 4,782,803 | 11/1988 | Kikuchi | 123/300 |
| 4,838,233 | 6/1989 | Hayashi et al. | 123/506 |
| 4,840,155 | 6/1989 | Karle | 123/506 X |

FOREIGN PATENT DOCUMENTS 3437053 6/1985 Fed. Rep. of Germany ...... 123/300

Primary Examiner—Willis R. Wolfe
Attorney, Agent, or Firm—Walter Ottesen

[57] ABSTRACT

The invention is directed to a method and an arrangement for controlling the fuel injection in a high-pressure fuel pump. Magnetic valves determine the fuel quantity to be injected into the engine. The magnetic valve is controlled during the pumping phase of the pumping element in such a manner that first a preinjection and then a main injection is carried out. In specific operating conditions, the control apparatus determines the duration of the drive pulses for the magnetic valve at which a preinjection just takes place. With the duration of the drive pulses as a basis, the control apparatus forms compensating signals for the drive pulses which effect preinjection and stores the same.

11 Claims, 2 Drawing Sheets

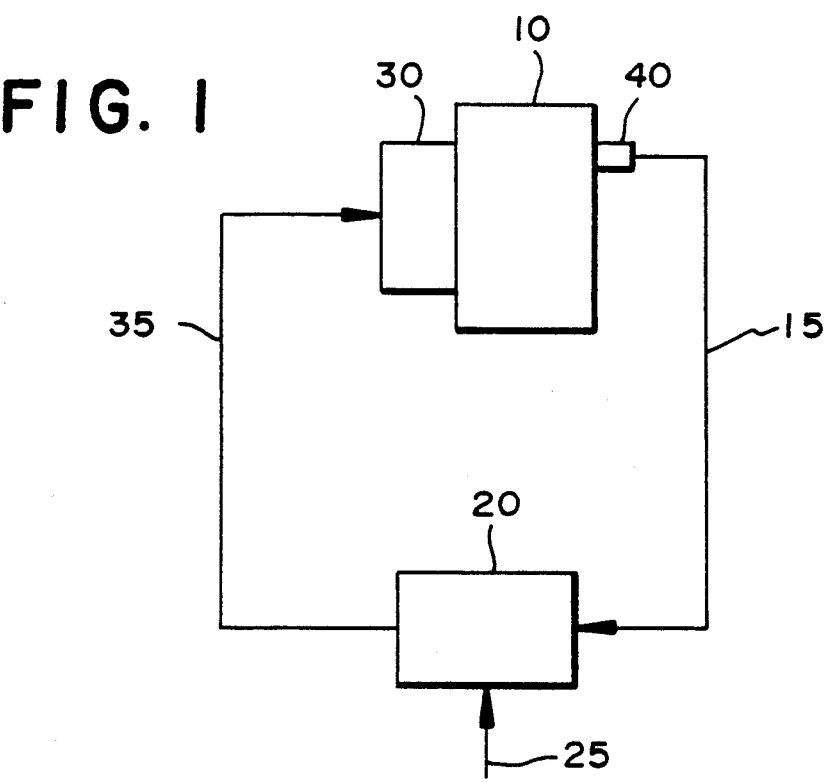
FIG. 1
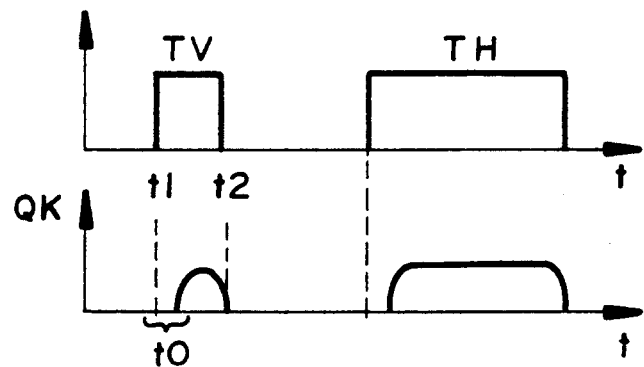
FIG. 2a
FIG. 2b
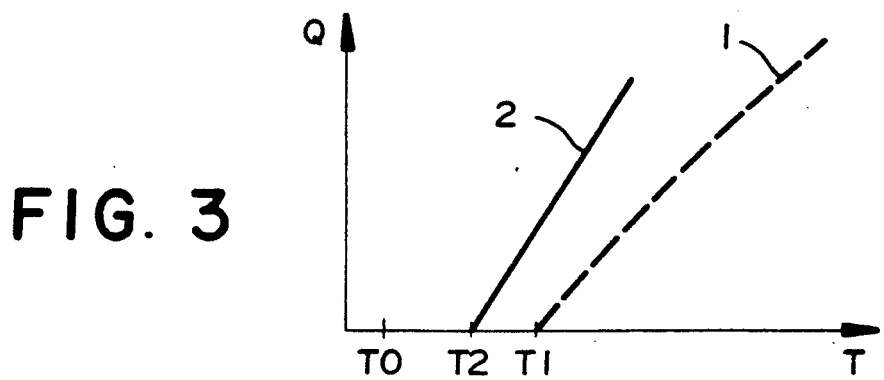
FIG. 3

METHOD AND ARRANGEMENT FOR CONTROLLING THE INJECTION OF FUEL IN AN INTERNAL COMBUSTION ENGINE

FIELD OF THE INVENTION

The invention relates to a method for controlling the injection of fuel for a high-pressure fuel pump having a pumping element and wherein at least one magnetic valve determines the quantity of fuel to be injected into the engine. The invention also relates to an arrangement for carrying out the method.

BACKGROUND OF THE INVENTION

A method of the kind referred to above for controlling the injection of fuel is disclosed in U.S. Pat. No. 4,782,803. This patent describes a method for controlling the injection of fuel of a high-pressure fuel pump. The quantity of fuel to be injected into the engine can be determined by a magnetic valve. In the pumping phase of a pumping element, the magnetic valve is selectively closed and opened so that a preinjection and thereafter a main injection can be carried out. Variations occur with respect to the quantity of fuel injected into the individual cylinders because of manufacturing tolerances and aging. These variations cause different quantities to be supplied to the engine during preinjection for the same drive signal. With respect to preinjection quantities, only very small quantities are involved and for this reason, the situation can occur wherein one or no preinjection at all occurs for the same drive signal. This causes the advantages of the preinjection to be lost; that is, increased combustion noise occurs.

SUMMARY OF THE INVENTION

It is an object of the invention to provide a method and arrangement for controlling the injection of fuel wherein variations in the quantity of injected fuel associated with preinjection are eliminated.

The method of the invention is for controlling the injection of fuel in a high-pressure fuel pump having a pumping element wherein at least one magnetic valve determines the quantity of fuel to be injected into the engine. The method includes the steps of: driving the magnetic valve with drive pulses during the pumping phase of the pumping element so as to cause first a preinjection and then a main injection to be carried out; determining the duration (DZ) of the drive pulse for specific operating conditions of the engine which just causes the preinjection to start; and, forming and storing compensating signals for drive pulses which effect the preinjection with these signals being based upon the duration (DZ).

The method and arrangement of the invention afford the advantage that the injected quantity of fuel always has the same value for the same duration of the drive signal for the preinjection. This condition is obtained in that the duration of the drive pulse for the magnetic valve, for which a preinjection is just occurring, is determined in specific operating conditions.

BRIEF DESCRIPTION OF THE DRAWINGS

The invention will now be described with reference to the drawings wherein:

FIG. 1 is a schematic of an arrangement of the invention for carrying out the method of the invention;

FIGS. 2a and 2b show the waveforms of the drive pulses for the preinjection TV and the main injection TH;

FIG. 3 is a graph showing the relationship between the duration of the drive pulse T and the injected fuel quantity QK; and, FIG. 4 is a flowchart for explaining the method of the invention.

DESCRIPTION OF THE PREFERRED EMBODIMENTS OF THE INVENTION

Figure 4:
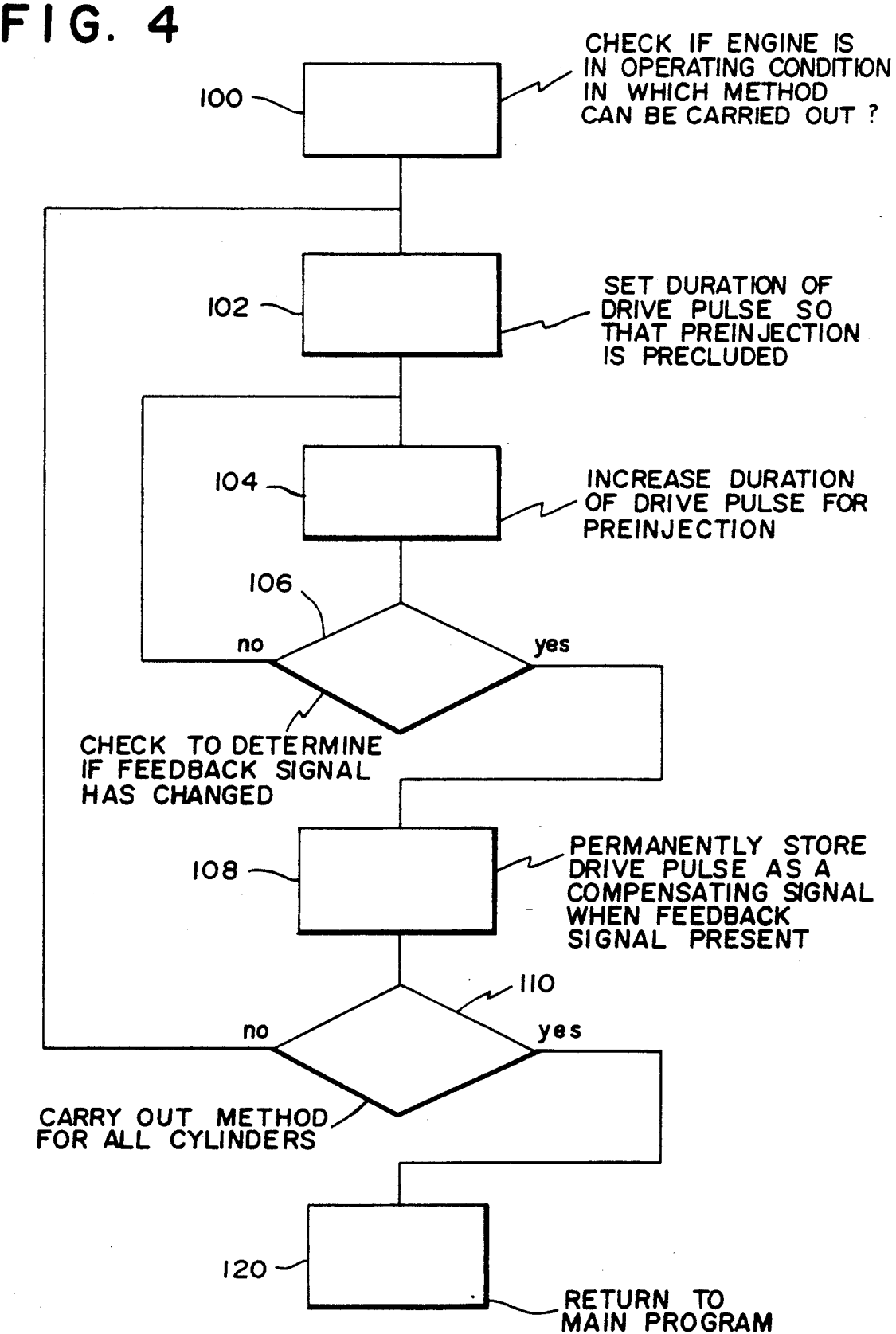

FIG. 1 shows the essential components of an arrangement of the invention for injecting fuel into an internal combustion engine. The engine 10 receives a specific quantity of fuel metered by the fuel pump 30. Various sensors 40 detect measured values 15 which characterize the operating condition of the engine and conduct these measured values to the control apparatus 20. Starting with the measured values 15 and other variables 25, the control apparatus 20 computes drive pulses 35 which are applied to the fuel pump 30. The internal combustion engine 10 is a self-igniting engine.

The control apparatus 20 computes the quantity of fuel to be injected into the engine in a known manner. This computation takes place in dependence upon various measured values 15 such as engine speed, engine temperature, actual injection start and possibly still further variables 25 which characterize the operational condition of the engine and these additional variables can, for example, be the position of the accelerator pedal 25 and the ambient air pressure. The control apparatus 20 then converts the desired fuel quantity into drive pulses 35. These drive pulses are then applied to the element of the fuel pump 30 determining the quantity. A magnetic valve can act as a quantity determining member which can be arranged so that the quantity of fuel to be injected is determined by the opening duration or the closure duration of the magnetic valve.

The magnetic valve is, for example, mounted in the high-pressure fuel pump in such a manner that during the pumping phase of the pump element, pressure builds up in the element chamber of the pump after closure of the magnetic valve and the injection takes place automatically when a predetermined pressure value is exceeded. The pressure in the element chamber falls off because of the opening of the magnetic valve and the injection is ended. A preinjection ahead of the actual main injection can be obtained by the short term closure and subsequent opening of the magnetic valve in the pumping phase of the pumping element.

A separate high-pressure fuel pump having a magnetic valve determining the quantity of fuel to be injected can be provided for each cylinder or a high-pressure fuel pump having a magnetic valve can charge all cylinders with fuel sequentially.

FIG. 2a shows a possible sequence of control pulses for a preinjection TV and a subsequent main injection TH. FIG. 2b shows the fuel quantity QK as a function of time t which occurs as a consequence of the drive pulses shown in FIG. 2a. FIGS. 2a and 2b show that at a time point t1, the magnetic valve closes and after a short delay time t0, fuel is injected. The magnetic valve opens at time point t2 and thereby terminates the metering of fuel. Normally, the drive pulse for the preinjection is substantially smaller than the drive pulse for the main injection TH. Magnetic valves can have different closure times for the same drive pulse. For this reason, the condition can occur that different quantities of fuel are injected for the same time duration of the drive pulse with the operating parameters being otherwise the same. Since the drive pulses for the preinjection are usually very short, the situation can occur that no preinjection occurs at individual magnetic valves. On the other hand, the situation can occur that the preinjection becomes so great that the exhaust gas values of the engine deteriorate.

FIG. 3 shows the relationship between the duration of the drive pulse T and the injected fuel quantity Q for the magnetic valves 1 and 2. The magnetic valve 1 meters fuel during a drive pulse of time duration T1. On the other hand, the magnetic valve 2 meters fuel already at a drive pulse of duration T2. If a signal of duration T2 is now applied to the magnetic valves, then a preinjection occurs only at the magnetic valve 2 whereas no injection occurs at magnetic valve 1.

It is an object of the method of the invention to compensate for these variations. Essentially two causes for these variations are present and these are on the one hand tolerances occurring during the manufacture of the magnetic valves and, on the other hand, aging in the injection system. This method is of special significance for pump-nozzle systems.

A method for compensating for these variations will now be described with reference to the flowchart of FIG. 4. This method is not only limited to magnetic valve controlled fuel pumps, but can be applied to other electrically controlled positioning devices for high-pressure fuel pumps.

In a first step 100, a check is made as to whether the engine is in an operating condition in which the method can be carried out. These are preferably a steady-state operating points. It is, however, also possible to initialize the method with a signal from an external control apparatus. This is the case when the method is carried out in the factory where the engine is produced or in the context of maintenance work and it is intended to retain the method as a basic adjustment.

In the initialization step 102, the duration of the drive pulse is set to such a small value t0 that preinjection is entirely precluded. The drive pulses for the main injection are maintained to a constant value in the following. In a further step 104, an increase in the duration of the drive pulse for the preinjection takes place. In step 106, a check is made as to whether a feedback signal has changed. With the change of the feedback signal, a detection can be made as to whether a preinjection took place or not. If the feedback signal does not change, then no preinjection occurred. If, on the other hand, the feedback signal changes at constant main injection, then a preinjection takes place. The feedback signals are detected by suitable sensors 40 in the same manner as the operating characteristic variables. One or a combination of the signals of different sensors can be used as feedback signals in an especially advantageous manner. Sensors which can be used are those sensors for detecting the injection duration, the element pressure, the combustion chamber pressure, the engine sound, the air sound or a light signal in the combustion chamber. These signals must be viewed in correlation with the drive signal of the preinjection. With a corresponding number of sensors, it is then possible to view each magnetic valve separately. If no feedback signal is present, then the duration of the drive pulse is increased until a feedback signal is present. When the feedback signal is present, the duration of the drive pulse is permanently stored (108) as a compensating signal. The inquiry unit 110 causes the process for all cylinders to be carried out. In step 120, a return takes place into the known main program for controlling the engine.

The following strategies are possible for carrying out the method. The method is first carried out in the factory of the engine producer or in the context of maintenance and is retained as a basic adjustment. Drifts during the service life are controllably compensated in dependence upon, for example, the running time weighted by engine speed and load. This method is carried out during operation at steady-state operating points. The compensating signals are then used in the subsequent injection operations for adaptively improving the control of the preinjection.

The values determined with the aid of the method can be advantageously stored in a characteristic field as a function of load and engine speed and then are available for each preinjection.

It is understood that the foregoing description is that of the preferred embodiments of the invention and that various changes and modifications may be made thereto without departing from the spirit and scope of the invention as defined in the appended claims.

What is claimed is:

1. An arrangement for controlling the injection of fuel in a high-pressure fuel pump having a pumping element and wherein at least one magnetic valve determines the quantity of fuel to be injected into the engine, the arrangement comprising:
   means for driving the magnetic valve with drive pulses during the pumping phase of the pumping element so as to cause first a preinjection and then a main injection to be carried out;
   means for determining the duration of the drive pulse for specific operating conditions of the engine which just causes the preinjection to start; and,
   means for forming and storing compensating signals for drive pulses which effect the preinjection with these signals being based upon the duration.

2. A method for controlling the injection of fuel in a high-pressure fuel pump having a pumping element and wherein at least one magnetic valve determines the quantity of fuel to be injected into the engine, the method comprising the steps of:
   driving the magnetic valve with drive pulses during the pumping phase of the pumping element so as to cause first a preinjection and then a main injection to be carried out;
   determining the duration of the drive pulse for specific operating conditions of the engine which just causes the preinjection to start; and,
   forming and storing compensating signals for drive pulses which effect the preinjection with these signals being based upon the duration.

3. The method of claim 2, wherein the compensating signals are determined once directly after the engine has been manufactured.

4. The method of claim 2, wherein the compensating signals for the preinjection are determined in stead-state operating points.

5. The method of claim 2, wherein the compensating signals are stored in a characteristic field as a function of load and engine speed.

6. The method of claim 2, wherein the drive pulses of the main injection are held constant during the determination of the compensating signals.

7. The method of claim 2, wherein the compensating signals for the preinjection are determined and stored for each cylinder.

8. The method of claim 2, wherein the compensating signals are determined once at specific intervals.

9. The method of claim 2, comprising the further steps of:

detecting a drive pulse for which no preinjection occurs; and, then increasing the duration of the drive pulse until a feed back signal is detected indicating that a preinjection occurs.

10. The method of claim 9, wherein one of the following variables is used as the feedback signal: injection duration, element pressure, combustion chamber pressure, engine body sound, air sound, and a light signal in the combustion chamber.

11. The method of claim 10, wherein the feedback signal is viewed in correlation with the drive signal of the preinjection.

* * * * *